Patented May 1, 1923.

1,453,734

UNITED STATES PATENT OFFICE.

HENRY THOMAS, OF CLEVELAND, OHIO.

METHOD OF REFINING IRON AND STEEL.

No Drawing. Application filed October 28, 1920. Serial No. 420,226.

*To all whom it may concern:*

Be it known that I, HENRY THOMAS, a citizen of the United States, and a resident of Cleveland, county of Cuyahoga, and State of Ohio, have invented a new and useful Improvement in Methods of Refining Iron and Steel, of which the following is a specification, the principle of the invention being herein explained and the best mode in which I have contemplated applying that principle, so as to distinguish it from other inventions.

The present improvements relate, as indicated, to a method of refining iron and steel, and are particularly directed to an improved method of refining or fluxing iron and steel scrap for the purpose of purifying it. To the accomplishment of the foregoing and related ends, said invention, then, consists of the means hereinafter fully described and particularly pointed out in the claims.

The following description sets forth in detail one method and one product exemplifying my invention, such disclosed procedure and product constituting however, but one of various applications of the principle of my invention.

My improved method of fluxing consists in fusing scrap iron and steel with flux consisting of silica sand, glass, lime, borax and fluorspar, the flux being charged into the furnace before the iron and steel scrap, so that the flux will lie at the bottom of the furnace, allowing the purifying elements thereof working up through the entire mass of molten metal. In some cases it may be possible or desirable to omit the silica sand, but generally this is an essential element of the fluxing composition, of which the preferred proportions are one part of sand, one part of borax, and one-half part each of glass, lime and fluorspar. The amount of flux necessary to refine a given weight of scrap metal will vary with the character of metal, and, if the metal contains any great amount of impurities, about one pound of the fluxing composition will be required to every hundred pounds of metal. The sand and fluorspar act to hold the entire mass together, while the lime serves to keep the metal from the furnace and to prevent sticking when the molten mass is poured. The flux having been introduced into the furnace and the scrap poured in on top of it, the entire mass is brought to a molten condition, by which time the flux has worked up through the molten mass carrying the impurities with it and forming a slag on the surface of the metal which may be skimmed off after which the molten metal can be poured into molds. I have found that this improved fluxing composition serves to place scrap iron and steel in practically as pure and usable condition as it was originally.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of refining iron and steel, the step which consists in fusing the iron and steel with a flux consisting of glass, lime, borax and fluorspar.

2. In a method of refining iron and steel, the step which consists in fusing the iron and steel with a flux consisting of glass, lime and fluorspar in about equal proportions together with borax.

Signed by me, this 23 day of October, 1920.

HENRY THOMAS.